United States Patent [19]

Claycomb

[11] 4,262,343
[45] Apr. 14, 1981

[54] PRESSURE PULSE DETECTION APPARATUS

[75] Inventor: Jack R. Claycomb, Houston, Tex.

[73] Assignee: Dresser Industries, Dallas, Tex.

[21] Appl. No.: 31,077

[22] Filed: Apr. 18, 1979

[51] Int. Cl.³ .............................................. G01V 1/40
[52] U.S. Cl. ........................................ 367/83; 175/48
[58] Field of Search ................................... 367/83–85, 367/81; 33/306, 307; 166/113; 175/40, 48, 50

[56] References Cited

U.S. PATENT DOCUMENTS

| | | | |
|---|---|---|---|
| 3,716,830 | 2/1973 | Garcia | 367/83 |
| 3,742,443 | 6/1973 | Foster et al. | 367/83 |
| 3,747,059 | 7/1973 | Garcia | 367/83 |

Primary Examiner—Nelson Moskowitz
Attorney, Agent, or Firm—Gunn, Lee & Jackson

[57] ABSTRACT

A pressure pulse detection apparatus is disclosed which is adapted to receive small signals from downhole measuring while drilling apparatus which signals are propogated as pressure pulses traveling upstream in a column of drilling mud, which signals are obscured by mud pump pressure and velocity variations traveling downstream and which are significantly larger. The preferred embodiment incorporates a transient pressure transducer and an ultrasonic fluid velocity detector, the two forming output signals which are conditioned, amplified and offset against one another. They cancel (when properly calibrated) so that pressure and velocity variations from the mud pump upstream are nulled to zero. They reinforce so that pressure and velocity variations from the downhole signal generator are enhanced, thereby forming an output signal of downhole variations of interest.

9 Claims, 1 Drawing Figure

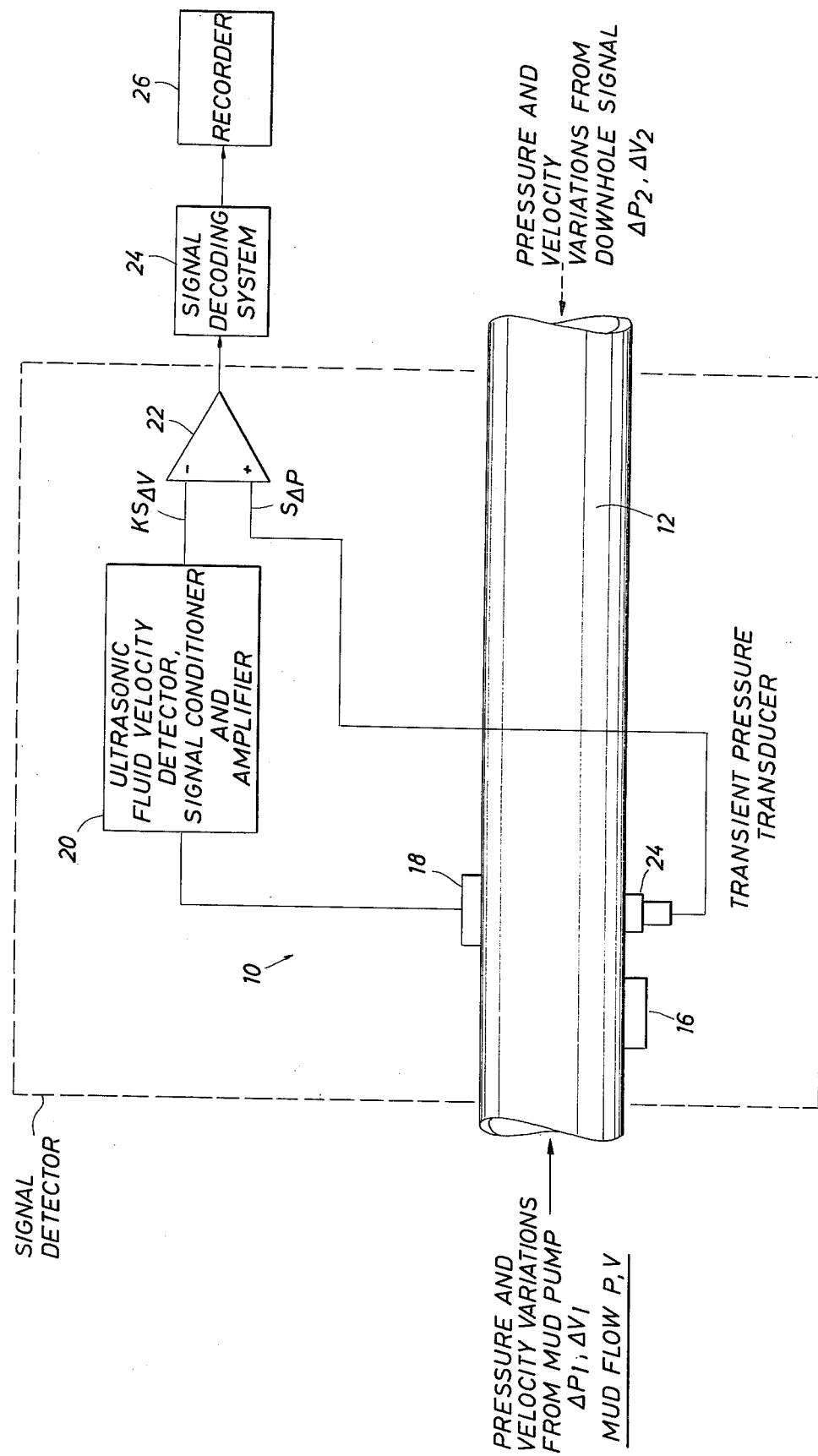

PRESSURE PULSE DETECTION APPARATUS

BACKGROUND OF THE DISCLOSURE

In drilling an oil well, a drill string having a drill bit affixed to the bottom is customarily used. The drill string is connected into a mud flow system which typically utilizes drilling mud which is pumped by a multiple cylinder pump. The pump connects through a mud line to the top of the drill string, and the mud is delivered under pressure to the top of the drill string for flowing through the drill string to the drill bit. The pump typically operates at high pressures, and pressures in the range of 2,000 to 3,000 psi at the pump discharge outlet are not uncommon. Typical pumps are multiple cylinder pumps. During the operation of the pumps, there are pressure surges in the range of 200 to 300 psi which are caused by power strokes of individual pistons within the pump. These pressure surges are quite large, especially at the surface where there is a minimum of pressure surge damping in the mud delivery system.

Measuring while drilling apparatus has been known heretofore. Such equipment typically operates by forming variable constrictions in the drill string. This forms a pressure pulse transferred through the standing column of mud in the drill string back to the surface. As an example, a constriction might be formed by the measuring while drilling apparatus which signal is then coupled through 10,000 feet of mud standing as a column within the drill pipe. While the mud might be deemed to be an incompressible fluid, nevertheless, the signal received at the surface from the downhole equipment is relatively small. It is relatively small, smaller than the pump surges found at the surface. The pressure pulses or variations at the surface are large; they can be ten to one hundred times greater than the variable data from the measuring while drilling apparatus.

In the operation of measuring while drilling apparatus, pressure pulses travel through the mud at a velocity equal to the acoustic velocity of the medium. Depending on the makeup of the drilling mud, this is a velocity of about 4,000 to 5,000 feet per second. Moreover, each pressure pulse is accompanied by a change in fluid velocity which is defined by the relationship quantifying the water hammer effect. The pressure change-velocity change relationship is therefore given by the following equation:

$$\Delta P = R_0 C \Delta V \tag{1}$$

where
$\Delta P$ = the magnitude of the pressure pulse,
$R_0$ = the fluid mass density,
C = the acoustic velocity in the fluid, and
$\Delta V$ = the change in fluid velocity.

As will be understood from the foregoing equation, pressure pulses formed by measuring while drilling apparatus are related to fluid velocity changes in the foregoing equation.

A typical mud pump forms a pressure surge during the power stroke of the individual pistons in it. This represents a positive pressure surge. This increases the mud flow velocity in the drill string. Conversely, pressure pulses from measuring while drilling apparatus located downhole decrease the mud flow velocity as a result of propogation in the opposite direction. Taking into account the direction of propogation in the system, there is, therefore, an interesting relationship. For a given pressure surge originating with the pump and moving downstream in the same direction as the mud flow, there is a positive pressure increase and a related velocity increase. Conversely, where the pressure pulse is originated at the downhole equipment and moves upstream against the flow of mud, a pulse originating at measuring while drilling apparatus and propogated upstream against the flow of mud is accompanied by a decrease in velocity of mud in the drill string. Intuitively, this conforms to the observation that measuring while drilling apparatus which momentarily constricts the mud flow to form a pressure pulse also retards the mud flow velocity.

This is a linear phenomena, and, thus, pulses traveling in both directions add algebraically. Pressure and velocity variations are thus cumulative.

From the foregoing, it will be observed that the ultrasonic fluid velocity is modified by pressure surges traveling both ways. It will be appreciated that pressure surges add to or momentarily reduce the quiescent pressure which is maintained in the system. As an example, the quiescent pressure may be 3,000 psi, whil the pump surges may be 200 or 300 psi short peaks added to the quiescent pressure. In any case, the quiescent pressure can be likened to a base value which, if properly manipulated, can be removed so that only pressure variations are noted.

The transient portion of the pressure signal is proportional to the flow or velocity variation. Thus, it is possible to obtain a signal which is proportional to pressure variations. It is also possible to obtain a signal proportional to velocity variations. These two signals are given by the following relationships:

$$S\Delta V = K_1 \Delta V \tag{2}$$

$$S\Delta P = K_2 \Delta P \tag{3}$$

A fundamental relationship which exists is given by the equation:

$$\Delta P = R_0 C \Delta V \tag{4}$$

where
$\Delta V$ = the velocity variation,
$\Delta P$ = the pressure variation,
$R_0$ = the fluid density, and
C, $K_1$ and $K_2$ = various constants.

Substituting equations, one obtains the relationship of:

$$S\Delta P = K_3 S\Delta V. \tag{5}$$

Through the manipulation of signals representative of these two quantities, reversal of polarity and appropriate addition, they can be offset against one another to obtain a null value. This relationship would thus be true in the case of positive values of pressure variation (increases above the quiescent value). This apparatus thus utilizes the detector system disclosed herein to obtain the difference in sensor outputs (after appropriate signal modification) which are caused by pump pressure and velocity variations and yields a null output. When this occurs, pump pressure pulses (noise) are eliminated from the output signal.

When a pressure variation is received from the downhole measuring while drilling apparatus, it is additive because the downhole pressure variation (accompanied by a propogated velocity variation) passes through the detector apparatus which responds to the velocity variation as a drop in velocity. In other words, a pulse propogated from the measuring while drilling apparatus has two manifestations, one being a pressure increase at the measuring equipment and the other being a velocity drop. In light of the relative polarity of the two signals which are created by the present apparatus, pump pressure pulses are eliminated, while pressure pulses from the downhole equipment are markedly increased.

The effects mentioned above are linear and, therefore, additive. Being additive, the pump noise (having the form of pressure and velocity spikes) are eliminated, while the signals from the downhole equipment are output by the equipment. The output signal is enhanced or increased.

BRIEF DESCRIPTION OF THE DRAWINGS

The single drawing discloses the present invention in schematic block diagram form installed on a mud line for communicating mud from a pump to a drill string.

DETAILED DESCRIPTION OF THE PREFERRED EMBODIMENT

Attention is directed to the single drawing where the numeral 10 identifies the apparatus of the present invention, which apparatus is described as a detector system. The detector system functions in cooperation with a pipe 12 which is one of the pipes which carries the mud flow from the pump to the drill string. The pipe 12 can be located at any convenient location along the route of the mud flow, as, for example, downstream of the pump output and upstream of the kelly. The particular location is subject to variation. The pipe 12 carries mud under pressure, typically in the range of 2,000 to 3,000 psi. The mud flows at a significant rate, perhaps as much as 1,000 gallons per minute. All of the mud flowing into the drill string flows through the pipe 12 from the pump. As shown at the left-hand side of the drawing, the mud flow is not precisely constant. Rather, pressure and velocity variations arising from operation of the mud pump occur. There is a quiescent pressure in the flow, and, in addition, there are incremental values added to the pressure and velocity. The quiescent values of the mud flow are represented by the symbols P and V which, respectively, represent pressure and velocity in some system of measure. The mud pump typically incorporates a two to four-piston pump, and each piston will typically form pressure variations and velocity variations. They are typically in the form of small pulses or spikes added to the quiescent pressure in the system. The mud flow is thus represented by the symbols P and V, and the incremental variations in mud flow pressure and velocity are represented by the symbols shown in the single drawing. Positive and negative values can both occur.

Continuing with the drawing, the numeral 16 identifies an ultrasonic fluid velocity signal generator which is affixed to the pipe 12. The numeral 18 identifies an ultrasonic fluid velocity signal detector. An ultrasonic beam is transmitted across the pipe. In most drilling muds, there is a large percentage of solids. A doppler-type ultrasonic transceiver is used in this case because it is difficult to force a signal across the diameter of the pipe in opaque fluids. The signal transmitter and receiver are located at the same point, and the signal bounces off the particles and returns to the point of transmission. When drilling with a low solid fluid, such as brine, an ultrasonic velocity meter utilizing a separated transmitter and receiver as shown in the drawing is used. In this case, the signal is transmitted through the fluid from one side of the pipe to the other, and, of course, the fluid velocity is detected by charges in the signal. In this case, there are not enough solids in the fluid to reflect the signal back toward the transmitter. If the mud is not moving, there is a minimal frequency shift in the signal. If the mud is flowing, a frequency shift occurs dependent on the doppler effect. Ultrasonic velocity meters utilizing doppler effect ultrasonic transmissions are believed typical in fluid velocity measurements, and such equipment is used here. The ultrasonic fluid velocity detector 18 is typically in the form of an ultrasonic signal receiver which forms an output signal which assumes a steady state value representative of the quiescent velocity. However, small variations in velocity are also measured by the equipment, and they, too, are formed at the output. Accordingly, the numeral 20 identifies a signal conditioner and amplifier for the detector 18. The detector 18 thus forms an output signal which can be described as having two portions, one being the DC value representative of the quiescent velocity and the other being the incremental variations in velocity. The signal conditioner simply subtracts out the quiescent velocity value. As an example, the velocity might be 1,000 gallons per minute, which is represented by a signal of 10.0 volts. If this is the case, the signal conditioner supplies a voltage equal to the quiescent voltage which is negative in value, thereby reducing the output voltage to zero. Then, only variations from the quiescent value are realized at the output of the signal conditioner 20.

The signal conditioner 20 incorporates an amplifier which applies a scale value of some arbitrary amount which is adjusted to some suitable level. The scale value thus has the form of an adjustable constant. The output signal is represented in the drawing as a constant multiplied by the signal from mud pump velocity variations. This is supplied to one input of a differential amplifier 22.

A transient pressure transducer 24 is installed adjacent to the transducer 18. The transient pressure transducer 24 is a transducer which responds only to the variations, not the absolute value. Again, the pressure can be deemed to be formed of two components, one being a quiescent or steady state value and the other being the additive noise value represented by the incremental pressure value shown in the drawing. For example, a strain gauge pressure transducer will form an output signal of both values. Utilizing a quartz crystal transducer element, the output signal which is formed includes only transient responses. In other words, the output signal is a function of pressure variations. The variation signal is input to the other terminal of the differential amplifier 22.

The differential amplifier 22 has two signals which are input to it, and they are subtracted from one another. The output of the amplifier 22 is thus given by the equation:

$$S_{\Delta P} - K S_{\Delta V} = \text{input signal} \qquad (6)$$

This is supplied to a signal decoding system 24 which, in turn, is connected to a strip chart time base recorder 26.

The single drawing shows a first set of pressure and velocity variations originated by the mud pump. It shows a second set of pressure and velocity variations from the downhole signal source which move upstream. The second set of signal variations interact with the transducers to form a cumulative or additive output signal for the recorder 26. Conversely, the mud pump variations are adjusted to zero by nulling the output of the differential amplifier. Consider the following as an example. Assume that the pressure is 3,000 psi and the velocity is 1,000 gallons per minute. (In actuality, flow rate and velocity are different, but they are proportional and, therefore, can be measured and differ only by a scale factor.) Presume further that the variations from the mud pump range up to ten percent (10%) of both values. The signals supplied to the differential amplifier 22 are adjusted until a null is achieved. That is to say, the pressure and velocity variations are sensed and are offset against one another, and the output signal discloses a null condition.

Assume further that the pressure and velocity variations from the downhole source are quite small, perhaps one percent (1%) or less of the quiescent values. These are coupled up the pipe 12 and moved past the transducers 18 and 24. Here, the velocity variation results in a reduction of pressure. Because of the phasing of the two voltages input to the differential amplifier, the two signals are then summed in an additive fashion, reinforcing one another and forming an output which is proportionate to the downhole variation.

Through the method of the present invention, mud pump variations are nulled to zero, while variations from the downhole signalling device are enhanced. This enables the apparatus to form the requisite output signals. The output signal which is thus formed is only the variable and does not include the noise or background. The present system forms an output signal dependent on transient values and not dependent on the quiescent value. This, therefore, enables the system to look for small changes with significant system amplification. Pump created noise is much larger in amplitude; the present invention reduces noise from upstream to a small value over a range of values, typically operating linearly to reduce the noise to a value below the signal of interest. The pump noise pulses can be as much as ten times the signal of interest and are reduced by this system to an insignificant value.

While the foregoing is directed to the preferred embodiment, the scope of the present disclosure is determined by the claims which follow.

I claim:

1. For use in a mud delivery system in drilling an oil well, the system using mud delivered from a mud pump through a pipe and wherein the pipe connects to a drill string extending to a downhole signalling apparatus where signals are propogated up the mud column standing in the drill pipe, an apparatus which comprises means for measuring and nulling to a minimum value variations in mud flow velocity and pressure from the mud pump traveling through the column of mud, said means forming an output signal representative of variations from the downhole signal apparatus.

2. The apparatus of claim 1 including a first means for measuring pressure variations in the mud column and a second means for measuring velocity variations in the mud column, and both said first and second means form output signals, a third means for summing weighted portions of output signals of said first and second means and forming an output sum wherein mud pump noise is accompanied by pressure and velocity increases which are summed and weighted to cancel a range of specified variations, and wherein signals from a downhole signalling apparatus are summed and weighted resulting in additive enhancement.

3. The apparatus of claim 1 including
(a) a velocity measuring means connected to measure velocity of mud flow in the mud delivery system downstream from the mud pump and which apparatus forms an output signal formed of two components, one component being a quiescent value and another component being a variable value;
(b) signal conditioning means connected to said velocity measuring means and including a means to null the quiescent component resulting in an output signal comprised of the variable component;
(c) pressure variation measuring means connected to measure pressure variations in the mud flow in the mud delivery system and forming an output signal representative of pressure variations in the mud flow in the mud delivery system; and
(d) differential amplifier means connected to said signal conditioning means and to said pressure variations measuring means for subtracting signals representative of pressure and velocity variations to form an output signal which output signal is representative of signals from the downhole signalling apparatus.

4. A method of detecting downstream pressure pulses from measuring while drilling equipment affixed near the lower portions of a drill string, which equipment forms signals traveling up the mud column in the drill string and which signals are obscured by pulses from noise sources elsewhere in the mud column which are propogated downstream, the method of the present invention comprising the steps of:
(a) measuring pressure variations of the mud flow in the drill string;
(b) measuring velocity variations of the mud flow in the drill string;
(c) adjusting the relative magnitude of the pressure and velocity variations by scale factors; and
(d) summing the scaled measurements in a manner such that
(1) pressure and velocity variations from upstream noise sources are nulled to a minimum; and
(2) pressure and velocity variations from the measuring while drilling apparatus are additively reinforcing.

5. The method of claim 4 including the step of measuring the absolute value of variations and subtracting therefrom the quiescent portion thereof.

6. The method of claim 4 wherein the step of adjusting variations includes the step of multiplying the value by a fixed scale factor.

7. The method of claim 4 wherein the step of measuring pressure variations responds to the changed value and subtracts a quiescent portion therefrom.

8. The method of claim 4 wherein the step of measuring velocity variations responds to the changed value and subtracts a quiescent portion therefrom.

9. The method of claim 4 wherein the step of adjusting the relative magnitude of pressure and velocity variations comprises the step of multiplying either the pressure or velocity variations by a selected scale factor.

* * * * *